US010566860B2

(12) United States Patent
Won

(10) Patent No.: US 10,566,860 B2
(45) Date of Patent: Feb. 18, 2020

(54) ROTOR ASSEMBLY, MOTOR AND DUAL CLUTCH TRANSMISSION

(71) Applicant: LG INNOTEK CO., LTD., Seoul (KR)

(72) Inventor: Il Sik Won, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 263 days.

(21) Appl. No.: 15/318,219

(22) PCT Filed: Jun. 12, 2015

(86) PCT No.: PCT/KR2015/005941
§ 371 (c)(1),
(2) Date: Dec. 12, 2016

(87) PCT Pub. No.: WO2015/190869
PCT Pub. Date: Dec. 17, 2015

(65) Prior Publication Data
US 2017/0133896 A1 May 11, 2017

(30) Foreign Application Priority Data
Jun. 13, 2014 (KR) .................. 10-2014-0072114

(51) Int. Cl.
H02K 1/27 (2006.01)
F16H 3/091 (2006.01)
(Continued)

(52) U.S. Cl.
CPC .......... H02K 1/2726 (2013.01); F16H 3/091 (2013.01); H02K 1/2733 (2013.01); H02K 1/30 (2013.01); F16H 3/006 (2013.01)

(58) Field of Classification Search
CPC ...... H02K 1/2726; H02K 1/2733; H02K 1/30; F16H 3/091; F16H 3/006
(Continued)

(56) References Cited

U.S. PATENT DOCUMENTS 6,084,330 A * 7/2000 Fisher .................. H02K 1/278
29/598
8,497,596 B2 * 7/2013 Tsutsumi .............. F16D 1/0882
290/55
(Continued)

FOREIGN PATENT DOCUMENTS

CN 2831587 Y 10/2006
CN 102044920 5/2011
(Continued)

OTHER PUBLICATIONS

Translated version of foreign patent CN 103580317 from Espacenet.*
(Continued)

Primary Examiner — Nguyen Tran
Assistant Examiner — Htet Z Kyaw
(74) Attorney, Agent, or Firm — KED & Associates LLP

(57) ABSTRACT

The present invention discloses a motor comprising: a stator part; and a rotor assembly rotatably disposed with respect to the stator part, wherein the rotor assembly comprises: a ring magnet including an insertion hole with a shaft disposed therein and a plurality of first grooves formed at one side thereof along a first imaginary circle; and a core member including a body portion disposed between the shaft and the insertion hole, and an extension portion covering the plurality of first grooves, wherein the extension portion comprises a plurality of second grooves deviated from a plurality of first imaginary straight lines which pass from a center of the first imaginary circle respectively through the plurality of first grooves.

20 Claims, 8 Drawing Sheets

(51) Int. Cl.
*H02K 1/30* (2006.01)
*F16H 3/00* (2006.01)

(58) Field of Classification Search
USPC .................. 310/156.13, 156.12, 61, 68
See application file for complete search history.

(56) References Cited

U.S. PATENT DOCUMENTS

| | | | | |
|---|---|---|---|---|
| 8,796,896 | B2* | 8/2014 | Lau | H02K 1/148 |
| | | | | 310/156.12 |
| 9,985,486 | B2* | 5/2018 | Asao | H02K 15/03 |
| 2001/0017492 | A1* | 8/2001 | Tajima | H02K 1/276 |
| | | | | 310/156.57 |
| 2003/0102946 | A1* | 6/2003 | Haussecker | G01B 7/30 |
| | | | | 335/302 |
| 2006/0055266 | A1* | 3/2006 | Iwami | B22F 7/062 |
| | | | | 310/156.47 |
| 2007/0262660 | A1* | 11/2007 | Utsumi | H02K 1/14 |
| | | | | 310/49.01 |
| 2007/0278885 | A1* | 12/2007 | Miyashita | H02K 1/278 |
| | | | | 310/156.47 |
| 2013/0187487 | A1* | 7/2013 | Honda | H02K 1/278 |
| | | | | 310/43 |
| 2013/0285482 | A1* | 10/2013 | Yamamoto | H02K 1/278 |
| | | | | 310/43 |
| 2014/0001890 | A1* | 1/2014 | Ota | H02K 1/2733 |
| | | | | 310/43 |
| 2014/0035422 | A1* | 2/2014 | Mikami | H02K 1/2713 |
| | | | | 310/156.71 |
| 2014/0077653 | A1* | 3/2014 | Takahashi | H02K 1/2766 |
| | | | | 310/156.53 |
| 2014/0271279 | A1* | 9/2014 | Kuba | F04D 25/06 |
| | | | | 417/420 |
| 2014/0363314 | A1* | 12/2014 | Jiang | H02K 1/278 |
| | | | | 417/84 |
| 2015/0076950 | A1* | 3/2015 | Asao | H02K 15/03 |
| | | | | 310/156.38 |
| 2015/0280535 | A1* | 10/2015 | Yang | H02K 1/165 |
| | | | | 310/156.38 |

FOREIGN PATENT DOCUMENTS

| | | | |
|---|---|---|---|
| CN | 103580317 | | 2/2014 |
| EP | 2 667 482 | | 11/2013 |
| EP | 2 670 031 | | 12/2013 |
| JP | 2000-333429 | | 11/2000 |
| JP | 2001-298887 | * | 10/2001 |
| JP | 2012-151979 | | 8/2012 |
| KR | 0133850 Y | * | 5/1999 |
| KR | 10-2013-0086176 | | 7/2013 |
| KR | 10-2013-0125738 | | 11/2013 |

OTHER PUBLICATIONS

Received STIC search report from EIC 2800 searcher Mesin Getaneh for claims 1 and 16 dated Sep. 18, 2018 and Sep. 21, 2018.*
Translated document of foreign patent KR0133850Y from the innovationQ Plus (IP.com) website (Year: 1999).*
European Search Report dated Jan. 4, 2018 issued in Application No. 15807274.4.
Chinese Office Action dated Jun. 19, 2018 issued in Application No. 201580031594.5 (with English translation).
International Search Report (with English translation) and Written Opinion dated Sep. 2, 2015 issued in Application No. PCT/KR2015/005941.

* cited by examiner

【FIG. 1】
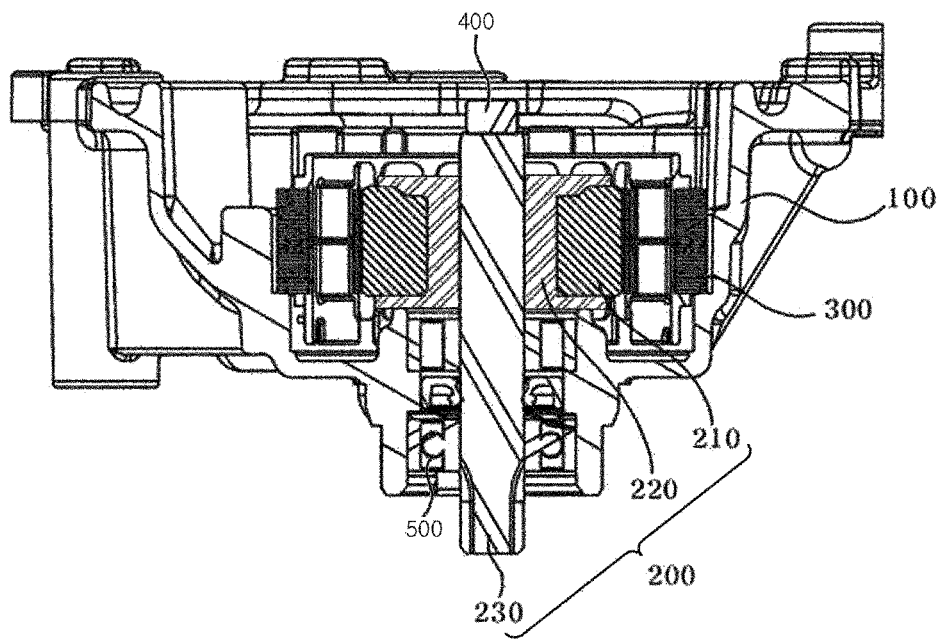
【FIG. 2】
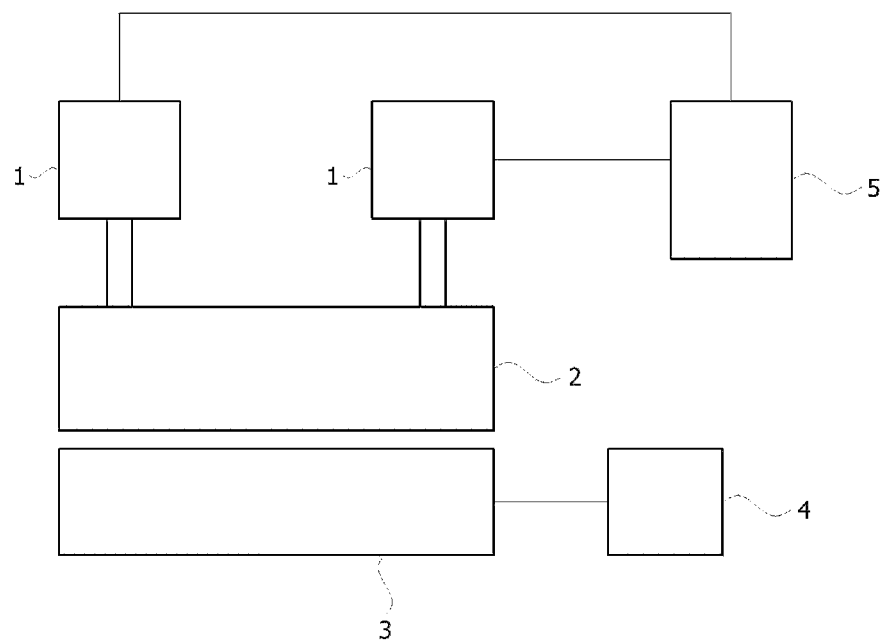

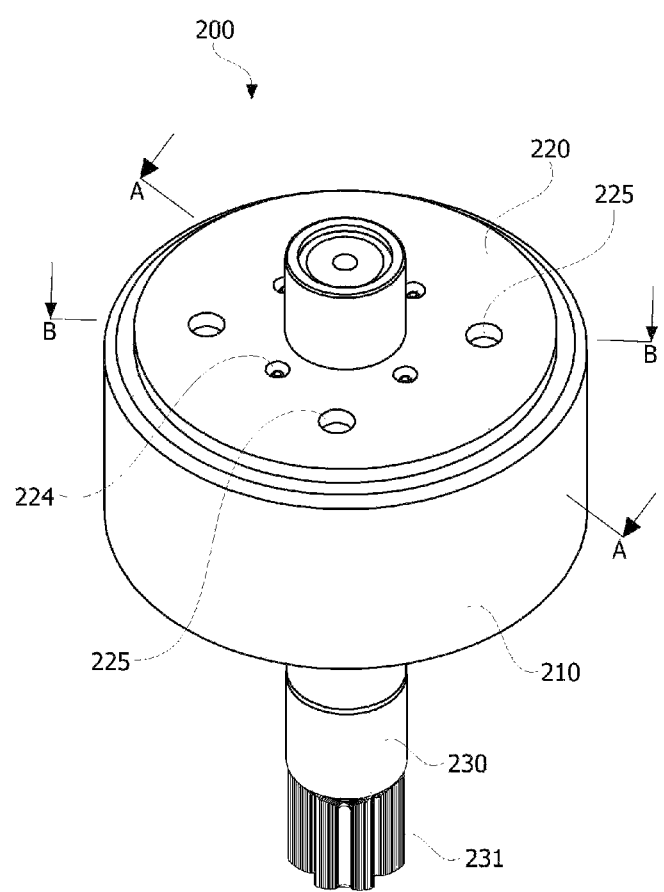
[FIG. 3]

[FIG. 4]
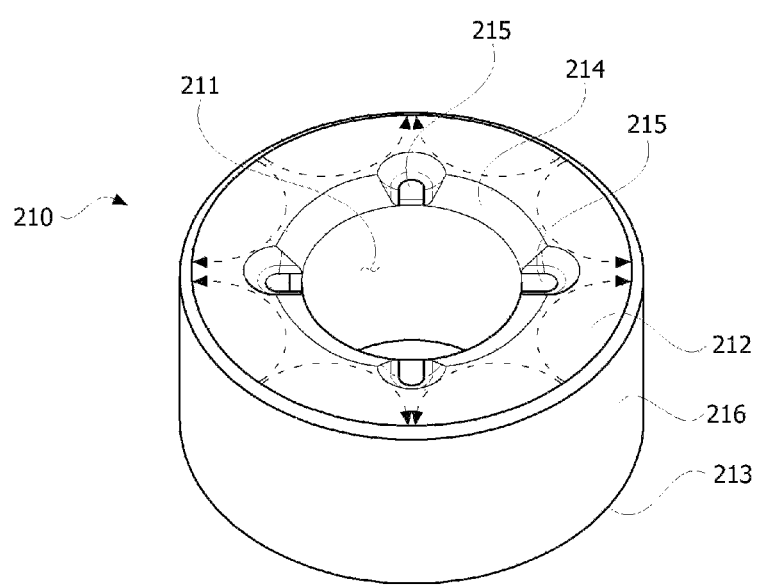

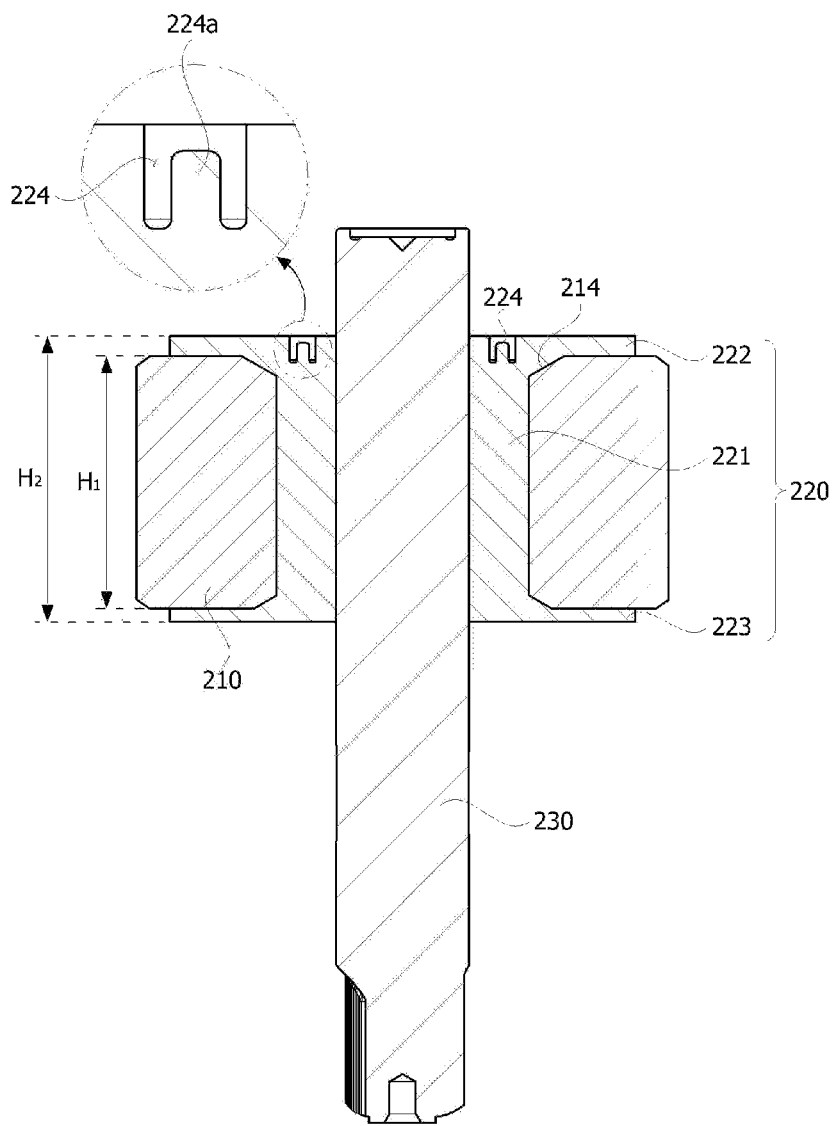
【FIG. 5】

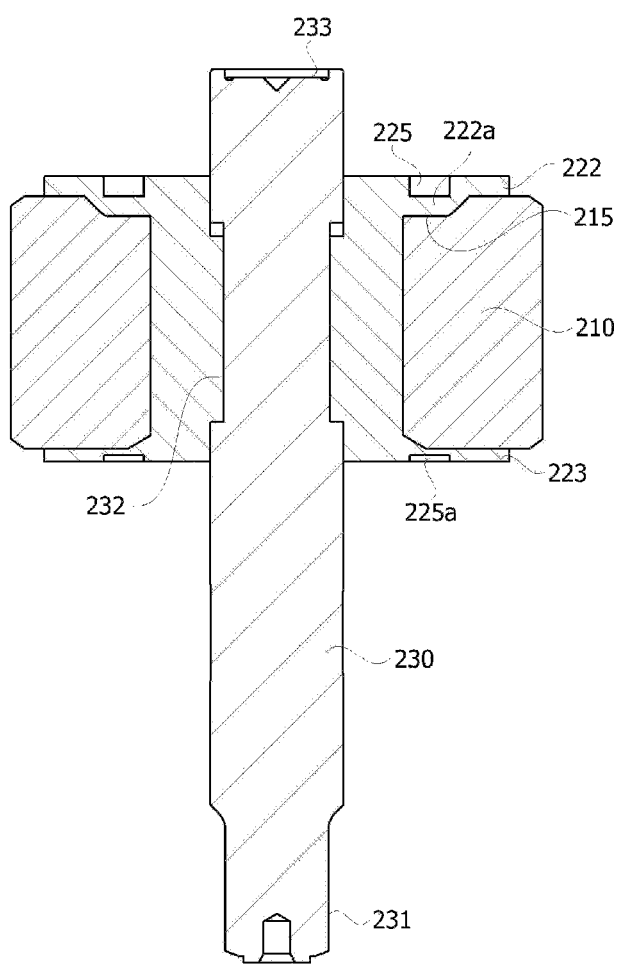
[FIG. 6]

[FIG. 7]
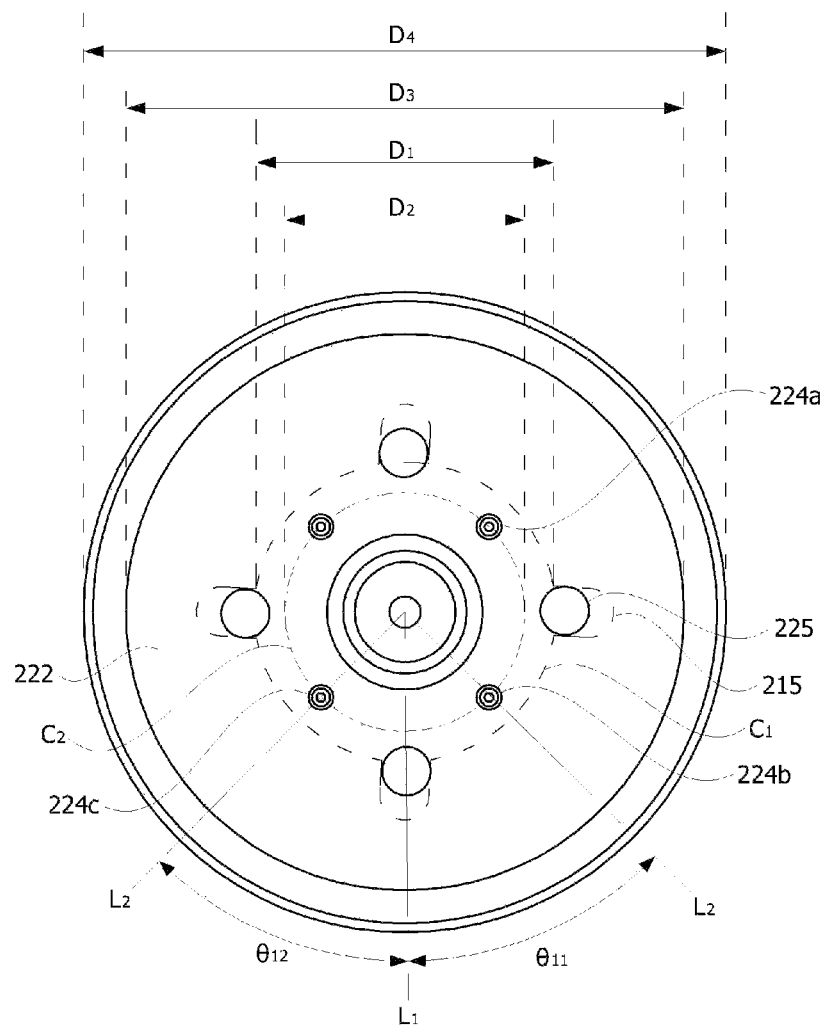

[FIG. 8]
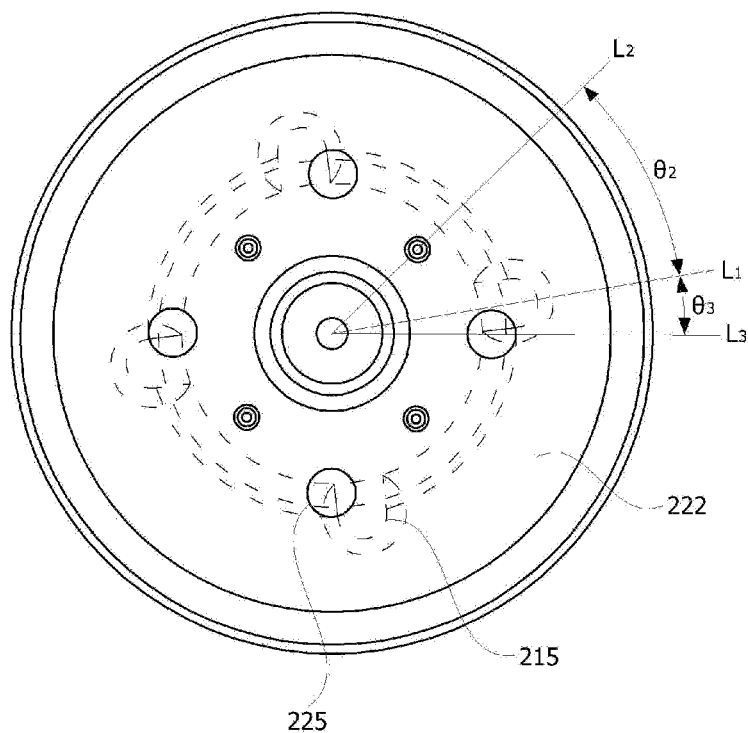
[FIG. 9]
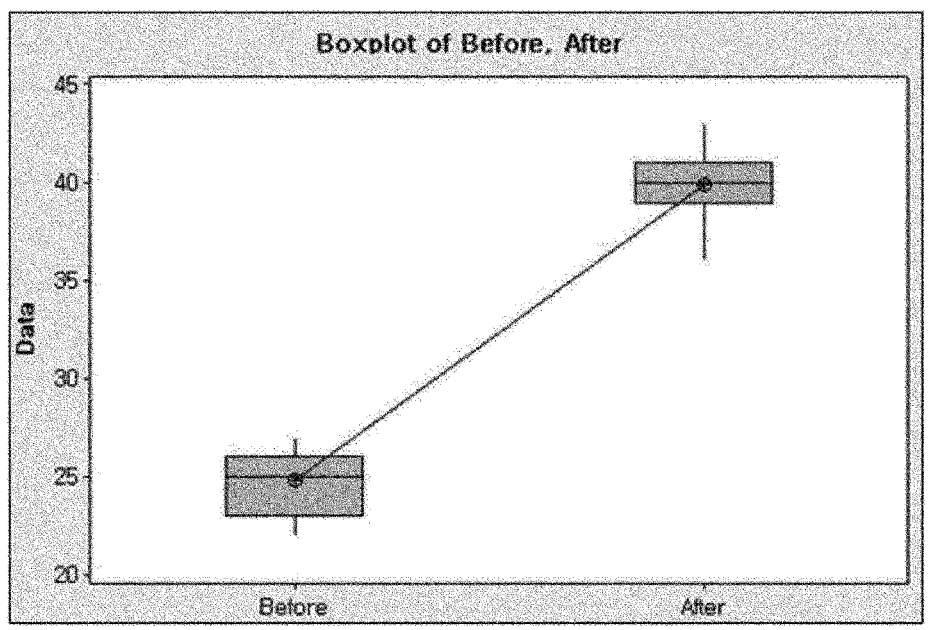

[FIG. 10]
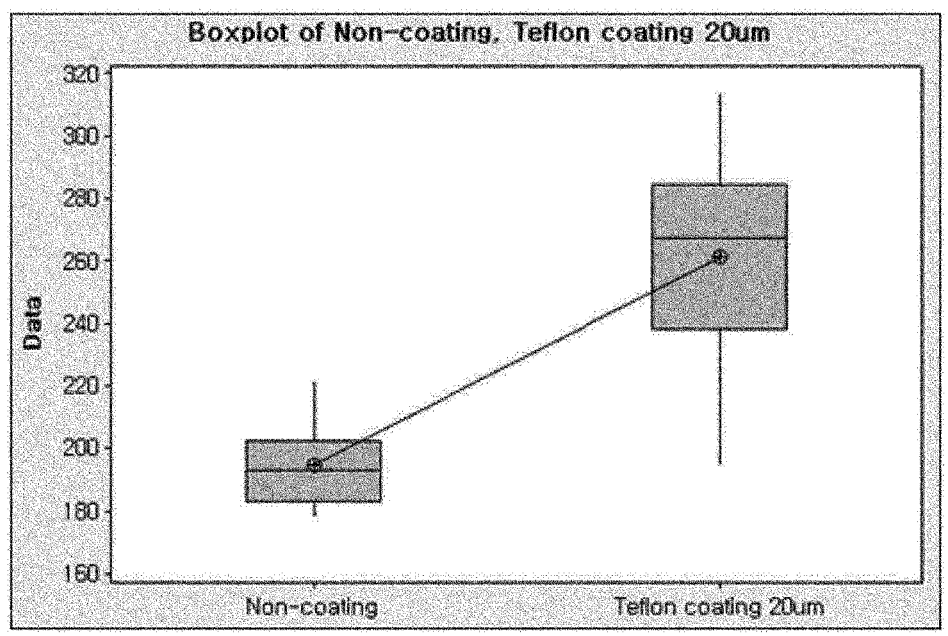

ROTOR ASSEMBLY, MOTOR AND DUAL CLUTCH TRANSMISSION

CROSS-REFERENCE TO RELATED PATENT APPLICATIONS

This application is a U.S. National Stage Application under 35 U.S.C. § 371 of PCT Application No. PCT/KR2015/005941, filed Jun. 12, 2015, which claims priority to Korean Patent Application No. 10-2014-0072114, filed Jun. 13, 2014, whose entire disclosures are hereby incorporated by reference.

TECHNICAL FIELD

The present invention relates to a rotor assembly, a motor, and a dual-clutch transmission (DCT) including the same.

BACKGROUND ART

A transmission of a vehicle, which is a transmission device manually operated by a clutch operation of a user or automatically operated by a mission depending on speed, is configured to include a motor.

Generally, an interior permanent magnet (IPM)-type motor having a permanent magnet installed in a rotor is used as a motor of a transmission.

Since an IPM-type motor uses an NdFeB-based permanent magnet which is lightweight and has strong magnetism, it has an advantage of high efficiency and power density.

However, an NdFeB-based permanent magnet includes neodymium (Nd), which is a rare earth, and thus there is a problem of an increase in manufacturing costs of a motor itself due to an increase in price of the rare earth.

Therefore, the recent trend is toward a rare earth-free motor which does not use rare earths.

A rare earth-free motor includes a ferrite magnet motor, an induction motor, a reluctance motor, and so on, and the most representative motor of these is the ferrite magnet motor.

A ferrite magnet motor is a motor using a ferrite magnet, which is a magnetic ceramic, and has an advantage of lower price and easier design than a rare earth motor.

However, since a ferrite magnet is relatively vulnerable to impact, it has problems in that a crack is generated when a motor rotates at a high speed and the performance of the motor is degraded due to discharging a cracked material.

DISCLOSURE

Technical Problem

The present invention is directed to providing a motor which is able to suppress a crack generated in a magnet.

Technical Solution

One aspect of the present invention provides a motor including a stator part and a rotor assembly disposed to be rotatable with the stator part. The rotor assembly may include a ring magnet configured to include an insertion hole in which a shaft is disposed and a plurality of first grooves formed on one surface thereof along a first imaginary circle and a core member configured to include a body portion disposed between the shaft and the insertion hole and an extension portion covering the plurality of first grooves. The extension portion may include a plurality of second grooves which are not on a plurality of first imaginary straight lines that respectively pass from a center of the first imaginary circle through the plurality of first grooves.

The plurality of second grooves may be disposed along a second imaginary circle defined on the extension portion.

A diameter of the second imaginary circle may be less than a diameter of the first imaginary circle.

The extension portion may have a diameter greater than a diameter of the first imaginary circle and cover at least a part of one surface and the other surface of the ring magnet.

The diameter of the first imaginary circle, the diameter of the second imaginary circle, a diameter of the extension portion, and a diameter of the ring magnet may satisfy the following formula 1.

$$D2<D1<D3 \leq D4 \quad \text{[Formula 1]}$$

Herein, D1 is the diameter of the first imaginary circle, D2 is the diameter of the second imaginary circle, D3 is the diameter of the extension portion, and D4 is the diameter of the ring magnet.

An axial length of the core member may be greater than a length of the ring magnet.

The extension portion may include a plurality of third grooves formed on one surface thereof.

The number of the third grooves may be the same as the number of the first grooves.

Third imaginary straight lines respectively passing from the center of the first imaginary circle through the third grooves may overlap with the first imaginary straight lines.

The third imaginary straight lines respectively passing from the center of the first imaginary circle through the third grooves may respectively have a predetermined angle with the first imaginary straight lines.

The second grooves are respectively disposed not to be on the third imaginary straight lines respectively passing from the center of the first imaginary circle through the third grooves.

An angle between each of the third imaginary straight lines respectively passing from the center of the first imaginary circle through the third grooves and each of the first straight lines may be less than an angle between each of second imaginary straight lines respectively passing from the center of the first imaginary circle through the second grooves and each of the first imaginary straight lines.

The angle between each of the third imaginary straight lines and each of the first imaginary straight lines is less than or equal to 10°.

The extension portion may include a first extension portion extending toward the one surface of the ring magnet and a second extension portion extending toward the other surface of the ring magnet, and the first extension portion and the second extension portion may be formed in a disk shape and have practically the same diameter.

The second grooves may have protrusion portions protruding from a bottom surface thereof.

Ends of the protrusion portions may be formed to be lower than a flat surface of the extension portion.

Another aspect of the present invention provides a motor including a stator part and a rotor assembly disposed to be rotatable with the stator part. The rotor assembly may include a ring magnet including an insertion hole in which a shaft is disposed, and a core member disposed between the shaft and the insertion hole and extending toward one surface and the other surface of the ring magnet. An extension portion may include a plurality of second and third grooves. The extension portion may include a plurality of second grooves which are not on a plurality of third imaginary straight lines respectively passing from a center of the insertion hole through the plurality of third grooves.

Advantageous Effects

A rotor assembly according to an exemplary embodiment of the present invention reduces generation of a crack by minimizing a pressure applied to a ring magnet when the rotor assembly is manufactured.

Also, the rotor assembly can use an injected resin instead of a metal core to reduce a weight of the rotor and mitigate an impact caused by vibration.

The rotor assembly, a motor and a dual-clutch transmission (DCT) including the same reduce an exposed area of the ring magnet and reduce generation of a crack.

The rotor assembly increases performance of the motor by preventing a cracked material from being discharged to the outside even when a crack is generated on the ring magnet.

The various effects and advantages of the present invention are not limited to the above description and may be more easily understood through a process of describing a detailed description of the exemplary embodiment of the present invention.

DESCRIPTION OF DRAWINGS

FIG. 1 is a conceptual view of a motor according to one embodiment of the present invention;

FIG. 2 is a conceptual view of a dual-clutch transmission (DCT) that the motor of one embodiment of the present invention is applied to;

FIG. 3 is a perspective view of a rotor assembly according to one embodiment of the present invention;

FIG. 4 is a perspective view of a ring magnet according to one embodiment of the present invention;

FIG. 5 is a cross-sectional view of FIG. 3 taken in a direction of A-A;

FIG. 6 is a cross-sectional view of FIG. 3 taken in a direction of B-B;

FIG. 7 is a planar projection view of the rotor assembly according to one embodiment of the present invention;

FIG. 8 is a modified example of FIG. 7;

FIG. 9 is a graph of measured slip torque of the motor according to one embodiment of the present invention; and FIG. 10 is a graph of measured coating effects according to one embodiment of the present invention.

MODES OF THE INVENTION

While the present invention may be modified in various ways and take on various alternative forms, specific embodiments thereof are shown in the drawings and described in detail below as examples. There is no intention to limit the present invention to the particular forms disclosed, and the invention should cover all modifications, equivalents, and alternatives falling within the spirit and scope of the appended claims.

It should be understood that, although the terms "first," "second," etc. may be used herein to describe various elements, these elements are not limited by these terms. These terms are only used to distinguish one element from another. For example, a second element could be termed a first element, and, similarly, a first element could be termed a second element, without departing from the scope of the present invention. As used herein, the term "and/or" includes any and all combinations of one or more of the associated listed items.

It should be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting to the invention. As used herein, the singular forms are intended to include the plural forms as well unless clearly indicated otherwise by context. It should be further understood that the terms "comprises," "comprising," "includes," and/or "including" specify the presence of stated features, integers, steps, operations, elements, and/or components when used herein, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It should be further understood that terms, such as those defined in commonly used dictionaries, should be interpreted as having a meaning that is consistent with their meaning in the context of the relevant art and are not to be interpreted in an idealized or overly formal sense unless expressly so defined here.

In the description of the embodiments according to the present invention, in a case in which any one element is formed "on" ("above") or "under" ("below") another element, "on" ("above") or "under" ("below") includes a case in which both of the elements are directly in contact with each other or at least one other element is indirectly disposed and formed between the two elements. Also, a case in which "on" ("above") or "under" ("below") is used may include a meaning of both an upward direction and a downward direction with respect to one element.

Hereinafter, embodiments of the present invention will be described with reference to the accompanying drawings, but like reference numerals refer to like components and overlapping descriptions thereof will be omitted.

FIG. 1 is a concept view of a motor according to one embodiment of the present invention, FIG. 2 is a concept view of a dual-clutch transmission (DCT) that the motor of one embodiment of the present invention is applied to, FIG. 3 is a perspective view of a rotor assembly according to one embodiment of the present invention, and FIG. 4 is a perspective view of a ring magnet according to one embodiment of the present invention.

According to FIG. 1, a motor according to an embodiment of the present invention includes a housing 100, a stator part 300, and a rotor assembly 200 disposed in the stator part 300.

The housing 100 has one open side so that the stator part 300 may be disposed and fixed in the housing 100. A shape of the housing 100 may be formed to vary depending on a type of motor to be used. When the housing 100 is used for a DCT, a pair of motors may be disposed in the housing 100 with a shape shown in FIG. 1.

A power output shaft (not shown) may be disposed on one side of the housing 100. The power output shaft may selectively receive power from a shaft 230 of the rotor assembly 200.

Unlike a single plate clutch transmission mounted in a conventional vehicle with a manual transmission, the DCT includes a set of two clutches so that first, third, and fifth-shift stages (a first speed change) are performed with power transmitted through one clutch, and second, forth, and sixth-shift stages (a second speed change) are performed with power transmitted through the other clutch. In this case, one motor of the pair of motors may transmit power for the first speed change, and the other motor may transmit power for the second speed change.

The DCT may provide convenient driving and smooth speed change like a vehicle with a conventional automatic transmission, and may provide fuel efficiency higher than that of a vehicle with a conventional manual transmission.

Referring to FIG. 2, the DCT includes a dual clutch 2 including a set of two clutches, a transmission control unit 3 configured to set each transmission by receiving power from the dual clutch 2, a clutch actuator 1 configured to control each of the clutches of the dual clutch 2, a gear shifting actuator 4 configured to shift gears by performing selecting and shifting on the transmission control unit 3, and a control unit 5 configured to control the clutch actuator 1 and the gear shifting actuator 4 by receiving all information of a vehicle, such as a vehicle speed, and a gear shifting command.

Therefore, the DCT is connected to the motor by a selecting operation of the clutch actuator 1 and transmits power to each transmission.

However, a structure of the DCT is not necessarily limited thereto, and various well-known configurations that control gear shifting by receiving driving power from the motor may be applied thereto.

Referring to FIG. 1 again, the stator part 300 is disposed in the housing 100. In the stator part 300, an insulator is disposed in a stator core, and a coil may be wound around the insulator. Therefore, the stator core is electrically insulated even when power is applied to the coil. Therefore, the stator core may include a coil wound around an integral stator core, and may be formed by coupling a plurality of divided cores to each other.

The rotor assembly 200 includes the shaft 230, a ring magnet 210, and a core member 220 that fixes the shaft 230 and the ring magnet 210.

Referring to FIG. 3, a plurality of second grooves 224 and a plurality of third grooves 225 may be formed on an upper surface of the core member 220. The second grooves 224 may have a shape corresponding to a shape of a nozzle injecting a molten injected resin into a metal mold when an injection molding of the core member is performed. The second grooves 224 may be formed at appropriate positions at which a flow of the resin is easily controlled when the injection molding is performed.

A plurality of third grooves 225 may be formed on an upper surface of the core member 220. The third grooves 225 may be formed at positions corresponding to positions of first grooves formed on the ring magnet 210. Therefore, the third grooves 225 may be a standard for controlling a mounting position when the rotor assembly 200 is mounted in the motor. The number of third grooves 225 may be the same as the number of first grooves of the ring magnet 210.

The shaft 230 is disposed to pass through the core member 220 and the ring magnet 210, and a gear 231 that transmits power to a transmission may be formed at one end of the shaft 230.

Referring to FIG. 4, the ring magnet 210 has one surface 212 and the other surface 213, and an insertion hole 211 into which the shaft 230 is inserted and which is formed at the center of the ring magnet 210. The ring magnet 210 may be manufactured with a ferrite sintering method.

The ring magnet 210 is a ferromagnetic oxide containing an iron oxide as a main component, and thus the ring magnet 210 is very chemically stable and may be a polar anisotropic ferrite sintered magnet using a Sr or Ba-based ferrite magnetization direction.

A method of manufacturing the ring magnet 210 includes a first step of wet-mixing iron oxide with a Sr or Ba-based oxide or carbide, a second step of performing calcination and crushing with a ferrite chemical reaction process, and a third step of adding a sintering additive, such as $CaCO_3$, $SiO_2$, $SrCO_3$, to the crushed material and forming a fine-milled slurry with an average grain diameter of 0.75-1.0 μm using a ball mill.

The method of manufacturing the ring magnet 210 further includes a fourth step of molding a multi-polar anisotropic magnet or a radial anisotropic magnet by drying the slurry and sintering and processing the formed object.

First grooves 215 may be a standard for deciding a magnetism direction of the ring magnet 210. The number of the first grooves 215 may be appropriately controlled depending on a pole number of magnet. A plurality of first grooves 215 may be formed to surround the insertion hole 211 and may be connected to the insertion hole 211. The insertion hole 211 is connected to an inclined surface 214 and may be formed to be wider toward the outside. The first grooves 215 may be formed to be wider in an axial direction.

FIG. 4 illustrates a configuration in which the ring magnet 210 is magnetized to have eight poles. The ring magnet 210 may be oriented in a dotted arrow direction as a magnetization direction thereof. However, the ring magnet 210 is not limited thereto, and may have a configuration in which the ring magnet is oriented in a radial direction as the magnetization direction thereof.

FIG. 5 is a cross-sectional view of FIG. 3 taken in a direction of A-A, and FIG. 6 is a cross-sectional view of FIG. 3 taken in a direction of B-B.

Referring to FIG. 5, the core member 220 includes a body portion 221 formed between the ring magnet 210 and the shaft 230 to fix the ring magnet 210 and the shaft 230, and extension portions 222 and 223 that extend from the body portion 221 and cover an upper surface and a lower surface of the ring magnet 210.

The core member 220 is formed between the ring magnet 210 and the shaft 230 by injection molding so that a manufacturing process thereof is simple. A weight of the rotor assembly 200 is reduced and an impact caused by vibration is mitigated. The core member may be manufactured of polyphenylene sulfide (PPS) or polyamide 9T (PA9T) which have a good thermal stability. However, the core member 220 is not limited thereto, and the core member 220 may be manufactured of various injected polymer resins.

Specifically, the extension portions 222 and 223 include a first extension portion 222 covering the upper surface of the ring magnet 210 and a second extension portion 223 covering the lower surface of the ring magnet 210. The first extension portion 222 and the second extension portion 223 may be formed in a disk shape and may have practically the same diameter and thickness.

The extension portions 222 and 223 have a predetermined thickness. Therefore, a length H2 of the core member 220 in an axial direction is greater than a length H1 of the ring magnet 210. The extension portions 222 and 223 may have a thickness that is sufficient to protect the upper surface and the lower surface of the ring magnet 210. Therefore, an exposed area of the ring magnet 210 is reduced and generation of a crack is reduced.

The first extension portion 222 includes the plurality of second grooves 224. The second grooves 224 may include protrusion portions 224a protruding from a bottom surface thereof. The protrusion portions 224a may be formed to be lower than a flat surface (an upper surface) of the first extension portion 222. Shapes of the second grooves 224 may correspond to a shape of a nozzle injecting a molten resin into a metal mold when the core member 220 is injection molded. The second grooves 224 may be formed at appropriate positions to easily control a flow of the injected resin.

The ring magnet 210 may have a specific gravity of 7.4 to 7.8, and a specific gravity of the core member 220 configured of an injected resin may be 1.5 to 1.9.

Referring to FIG. 6, the first extension portion 222 may include a fixing part 222a coupled to the first groove 215 formed on the ring magnet 210. The fixing part 222a may be a portion inserted into the first groove 215 when the injection molding is performed. Therefore, the ring magnet 210 and the core member 220 may be prevented from slipping even when the rotor assembly 200 rotates at a high speed.

The first extension portion 222 may include the third grooves 225 that correspond to the first grooves 215. Also, the second extension portion 223 may include fourth grooves 225a that correspond to the third grooves 225.

The shaft 230 may include a fixing groove 232 formed on an inner circumferential surface thereof. The fixing groove 232 is intermittently or continuously formed to increase bonding force between the core member 220 and the shaft 230. The gear 231 that transmits power is formed at one end of the shaft 230, and a groove 233 to which a magnet (400 of FIG. 1) may be attached may be formed at the other end thereof.

FIG. 7 is a planar projection view of the rotor assembly according to one embodiment of the present invention, and FIG. 8 is a modified example of FIG. 7.

Referring to FIG. 7, the third grooves 225 may be formed at positions corresponding to the first grooves 215 of the ring magnet 210 when seen in the planar projection view. Therefore, a third imaginary straight line (overlapped with L1) passing through the center of a first imaginary circle C1 and the third grooves 225 may correspond to a first imaginary straight line L1 passing through the center of the first imaginary circle C1 and the first grooves 215.

The third grooves 225 are formed at positions corresponding to the first grooves 215 which are a standard for setting the magnetization direction of the ring magnet, and the rotor assembly may be accurately mounted on the motor using the third grooves 225.

The plurality of first grooves 215 of the ring magnet 210 are disposed along the first imaginary circle C1, and the plurality of second grooves 224 may be disposed along a second imaginary circle C2. In this case, the first imaginary circle C1 may have the same diameter as that of the insertion hole of the ring magnet and a diameter greater than that of the insertion hole.

A diameter of the second imaginary circle C2 may be smaller than the diameter of the first imaginary circle C1. When the second imaginary circle C2 is larger than the first imaginary circle C1, a pressure of the injected resin introduced when the injection molding is performed is directly applied to one surface of the ring magnet 210, and thus the ring magnet 210 may be damaged.

The diameter of the first extension portion 222 of the core member is formed to be greater than the first imaginary circle C1 to cover the one surface and the other surface of the ring magnet 210. In the case, the first extension portion 222 may cover the first groove 215 of the ring magnet 210. Particularly, a ratio of a diameter of the body portion of the core member to the diameter of the ring magnet may be 1:2 to 1:2.5.

Therefore, a diameter D1 of the first imaginary circle C1, a diameter D2 of the second imaginary circle C2, a diameter D3 of the first extension portion 222, and a diameter D4 of the ring magnet 210 may satisfy the following formula 1.

$$D2<D1<D3\leq D4 \quad\quad\quad \text{[Formula 1]}$$

The second grooves 224 may be disposed not to be on the first imaginary straight line L1 passing through the center of the first imaginary circle C1 and the plurality of first grooves 215. When the second grooves 224 are disposed on the first imaginary straight line L1, an injection pressure is directly applied to the the first grooves 215 when the core member 220 is injection-molded, and thus there is a problem in which excessive stress is concentrated on the first grooves 215.

Also, a temperature of the injected resin is greater than or equal to about 300° C. so that a momentary temperature difference is generated and a thermal impact may cause cracks around the first grooves 215.

Therefore, the second grooves 224 are disposed not to be on the first imaginary straight lines L1, and thus a stress applied to the first grooves 215 may be relatively mitigated when the rotor is manufactured.

Each of the first grooves 215 and/or the third grooves 225 may be disposed between a plurality of second grooves 224a, 224b and 224c, and the first grooves 215 and the second grooves 224 may be disposed at an angle of about 25° to 55°. In this case, an angle θ11 between the second groove 224b and the third groove 225 may be the same as or different from an angle θ12 between the second groove 224c and the third groove 225.

Referring to FIG. 8, the third grooves 225 and the first grooves 215 may be disposed not to correspond to each other. Such a structure has an advantage in that the core member 220 may stably support the ring magnet 210 when the rotor rotates at high speed by increasing the thicknesses of the extension portions 222 and 223 filling the first grooves 215.

Therefore, the first imaginary straight line L1 and each of a third imaginary straight line L3 passing through the center of the first imaginary circle C1 and the third grooves 225 are disposed not to correspond to each other so that a predetermined angle θ3 exists between them. For example, the third imaginary straight line L3 and the first imaginary straight line L1 may have an angle of less than or equal to 10°.

In this case, the second grooves 224 may be disposed at positions which also do not correspond to the third imaginary straight lines L3. That is, the angle θ3 between the third imaginary straight line L3 and the first imaginary straight line L1 may be less than an angle θ2 between the second imaginary straight line L2 and the first imaginary straight line L1. That is, the third grooves 225 may be disposed closer to the first grooves 215 than the second grooves 224.

The third grooves 225 may mark the magnetization direction of the ring magnet, and thus it is advantageous to dispose the third grooves 225 close to the first grooves 215. The second grooves 224 are disposed as far away from the first grooves 215 as possible to mitigate stress applied to the first grooves 215.

FIG. 9 is a graph of measured slip torque of the motor according to one embodiment of the present invention, and FIG. 10 is a graph of measured coating effects according to one embodiment of the present invention.

In FIG. 9, the vertical axis shows a torque value (N·mm) The left side (Before) of the horizontal axis shows torque data of an existing motor, and the right side (After) thereof shows torque data of a motor using the rotor according to the embodiment of the present invention.

Referring to FIG. 9, the motor according to the embodiment of the present invention generates 40 N·m of torque, while the existing motor generates 25 N·m of torque. The torque data of the motor to which the embodiment of the present invention is applied is more remarkably increased compared to the torque of the existing motor. The first grooves of the ring magnet are filled with the core member so that the extension portions of the core member cover the upper surface and the lower surface of the ring magnet, and thus slip torque is increased. Slip torque refers to torque generated when a magnet slips from a core member when a rotor suddenly stops during rotation.

Referring to FIG. 4, a coating layer may be formed on at least one of the one surface 212, the other surface 213, and an outer circumferential surface 216 of the ring magnet 210. Therefore, even through cracks are generated on the ring magnet 210, a cracked material is prevented from being discharged to the outside, and thus the performance of the motor can be increased. Also, the magnet is prevented from being corroded.

A method of forming a coating layer includes sanding and preheating a surface of the ring magnet 210, coating the sanded surface, post-heating the coating layer, and manufacturing the coating layer. However, the coating method is only an exemplary example and is not limited thereto. Various coating methods may be applied depending on kinds of coating materials.

A Teflon coating layer may be formed at a thickness of 10 to 30 μm. However, the coating material is not necessarily limited thereto, and various coating materials that prevent a crack generated in the ring magnet 210 or corrosion of the magnet may be selected.

The vertical axis in FIG. 10 shows an inner pressure value of the ring magnet 210. The left side of the horizontal axis shows inner pressure data when a Teflon coating is not formed, and the right side thereof shows an inner pressure data when a 20 μm thickness Teflon coating is formed. Referring to FIG. 10, when the Teflon coating is formed, inner pressure performance is increased more than the case in which the coating is not formed.

The invention claimed is:

1. A rotor comprising:
a shaft;
a ring magnet including a first hole into which the shaft is inserted, the ring magnet having an upper surface; and
a core member disposed between the shaft and the ring magnet and including a resin material, and a part of the core member is on the upper surface of the ring magnet,
wherein the ring magnet includes a plurality of first recesses disposed on the upper surface of the ring magnet,
wherein an upper surface of the core member is disposed on the upper surface of the ring magnet such that the upper surface of the core member is spaced apart in the axial direction from the upper surface of the ring magnet,
wherein the core member includes a plurality of second recesses disposed on the upper surface of the core member, the second recesses and the first recesses being disposed to be misaligned in a radial direction,
wherein a shortest distance between the shaft and one of the second recesses is less than a shortest distance between the shaft and one of the first recesses in the radial direction, and
wherein a shortest distance in a radial direction between the shaft and an outer end of the upper surface of the core member is greater than the shortest distance in a radial direction between the shaft and the one of the first recesses on the upper surface of the ring magnet.

2. The rotor of claim 1, wherein:
the core member includes a plurality of third recesses disposed on the upper surface of the core member, and
wherein a shortest distance between the shaft and one of the third recesses is less than the shortest distance between the shaft and the one of the first recesses in the radial direction; and
wherein the third recesses at least partially overlap with the first recesses in an axial direction.

3. The rotor of claim 2, wherein the shortest distance between the shaft and the one of the second recesses is less than the shortest distance between the shaft and the one of the third recesses in the radial direction.

4. The rotor of claim 3, wherein the second recesses and the third recesses are disposed to be misaligned in a radial direction.

5. The rotor of claim 2, wherein:
the plurality of second recesses are disposed on a same circumference about the shaft; and
the plurality of third recesses are disposed on a same circumference about the shaft.

6. The rotor of claim 2, wherein the third recesses are disposed in a same direction as the first recesses in a radial direction.

7. The rotor of claim 2, wherein an angle between a center of one of the first recesses and a center of one of the second recesses in a circumferential direction with respect to the shaft is greater than an angle between the center of one of the first recesses and a center of one of the third recesses in a circumferential direction with respect to the shaft.

8. The rotor of claim 1, wherein the core member is made of injected polymer resin, the polymer resin made of polyphenylene sulfide (PPS) or polyamide 9T (PA9T).

9. The rotor of claim 1, wherein each of the second recesses separately includes protrusion portions protruding from a bottom surface thereof, and ends of the protrusion portions are formed at a lower level than the upper surface of the core member in the radial direction.

10. The rotor of claim 1, wherein the core member covers the first recesses.

11. The rotor of claim 1, wherein the upper surface of the core member partially overlaps with the first recesses in an axial direction.

12. The rotor of claim 1, wherein the shaft includes fourth recesses disposed on a surface thereof which are coupled to the core member.

13. The rotor of claim 1, wherein a length of the core member in an axial direction is greater than a length of the ring magnet in the axial direction.

14. The rotor of claim 2, wherein the first recesses include a bottom surface and a side surface extending from the bottom surface to the upper surface of the ring magnet.

15. A motor comprising:
a rotor; and
a stator,
wherein the rotor comprises;

a shaft;

a ring magnet including a first hole into which the shaft is inserted, the ring magnet having an upper surface; and a core member disposed between the shaft and the ring magnet and including a resin material, and a part of the core member is on the upper surface of the ring magnet, wherein the ring magnet includes a plurality of first recesses disposed on an upper surface of the ring magnet, wherein an upper surface of the core member is disposed on the upper surface of the ring magnet such that the upper surface of the core member is spaced apart in the axial direction from the upper surface of the ring magnet, wherein the core member includes a plurality of second recesses disposed on the upper surface of the core member, the second recesses and the first recesses being disposed to be misaligned in a radial direction, wherein a shortest distance between the shaft and one of the second recesses is less than a radially shortest distance between the shaft and one of the first recesses in the radial direction, and wherein a shortest distance in a radial direction between the shaft and an outer end of the upper surface of the core member is greater than the shortest distance in a radial direction between the shaft and the one of the first recesses on the upper surface of the ring magnet.

16. The motor of claim 15, wherein:

the core member includes a plurality of third recesses disposed on the upper surface of the core member, and wherein a shortest distance between the shaft and one of the third recesses is less than the radially shortest distance between the shaft and the one of the first recesses in the radial direction; and wherein the third recesses at least partially overlap with the first recesses in an axial direction.

17. The motor of claim 16, wherein the shortest distance between the shaft and the one of the second recesses is less than the shortest distance between the shaft and the one of the third recesses in the radial direction.

18. The motor of claim 17, wherein the second recesses and the third recesses are disposed to be misaligned in the radial direction.

19. The motor of claim 15, wherein the first recesses include a bottom surface and a side surface extending from the bottom surface to the upper surface of the ring magnet.

20. The motor of claim 15, wherein each of the second recesses separately includes protrusion portions protruding from a bottom surface thereof, and ends of the protrusion portions are formed at a lower level than the upper surface of the core member in the axial direction.

* * * * *